United States Patent
Kwon et al.

(10) Patent No.: US 11,392,694 B2
(45) Date of Patent: Jul. 19, 2022

(54) ELECTRONIC APPARATUS AND CONTROLLING METHOD THEREOF

(71) Applicant: SAMSUNG ELECTRONICS CO., LTD., Suwon-si (KR)

(72) Inventors: Sangwan Kwon, Suwon-si (KR); Jaemin Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 488 days.

(21) Appl. No.: 16/592,999

(22) Filed: Oct. 4, 2019

(65) Prior Publication Data

US 2020/0110876 A1 Apr. 9, 2020

(30) Foreign Application Priority Data

Oct. 4, 2018 (KR) .................. 10-2018-0117975

(51) Int. Cl.
*G06F 21/56* (2013.01)
*G06F 9/455* (2018.01)
(Continued)

(52) U.S. Cl.
CPC .......... *G06F 21/56* (2013.01); *G06F 9/45533* (2013.01); *G06F 9/54* (2013.01);
(Continued)

(58) Field of Classification Search
CPC .... G06F 21/56; G06F 9/54; G06F 2221/2111; G06F 21/566; H04L 41/0893; H04L 63/10
See application file for complete search history.

(56) References Cited

U.S. PATENT DOCUMENTS 9,910,720 B2 3/2018 Karhunen
2006/0021029 A1 1/2006 Brickell et al.
(Continued)

FOREIGN PATENT DOCUMENTS

JP 3630087 B2 3/2005
JP 6013613 B2 10/2016
(Continued)

OTHER PUBLICATIONS

Anonymous, "IBM QRadar Behavior Analytics (UBA) app, Version 3.3.0 User Guide", IBM, 2016, pp. 1-264 (274 total pages).
(Continued)

*Primary Examiner* — Huan V Doan
(74) *Attorney, Agent, or Firm* — Sughrue Mion, PLLC

(57) ABSTRACT

A controlling method of an electronic apparatus is provided. The controlling method of the electronic apparatus includes monitoring whether an application executed by the electronic apparatus performs a potentially malicious action, detecting that the application is a suspicious application based on the monitoring of the potentially malicious action, and isolating the suspicious application. The isolating may include at least one of: blocking communication with other applications stored in the electronic apparatus (or executed by the electronic apparatus) or blocking access to a shared memory (or shared directory). The controlling method may also include, based on the suspicious application being identified as not being malicious after the isolating of the suspicious application, releasing the isolating of the suspicious application.

18 Claims, 11 Drawing Sheets

(51) Int. Cl.
   *G06F 9/54* (2006.01)
   *H04L 41/0893* (2022.01)
   *H04L 9/40* (2022.01)

(52) U.S. Cl.
   CPC .......... *H04L 41/0893* (2013.01); *H04L 63/10* (2013.01); *G06F 2221/2111* (2013.01)

(56) References Cited

U.S. PATENT DOCUMENTS

| | | | |
|---|---|---|---|
| 2007/0130621 | A1 | 6/2007 | Marinescu et al. |
| 2007/0250929 | A1 | 10/2007 | Herington et al. |
| 2011/0145926 | A1* | 6/2011 | Dalcher ................ G06F 21/552 726/26 |
| 2016/0026813 | A1* | 1/2016 | Neitzel ................ G06F 21/604 726/17 |
| 2018/0067759 | A1 | 3/2018 | Bavishi et al. |
| 2018/0082046 | A1 | 3/2018 | Bercow et al. |
| 2018/0121186 | A1 | 5/2018 | Chen et al. |
| 2018/0129821 | A1 | 5/2018 | Havewala et al. |

FOREIGN PATENT DOCUMENTS

| | | |
|---|---|---|
| JP | 2018-501590 A | 1/2018 |
| WO | 2014063124 A1 | 4/2014 |
| WO | 2017203105 A1 | 11/2017 |

OTHER PUBLICATIONS

Xia M. et al., "Effective Real-time Android Application Auditing", 2015 IEEE Symposium on Security and Privacy, pp. 899-914, (16 pages total).

Communication dated Feb. 4, 2020 from the European Patent Office in application No. 19201214.4.

Kamp, P-H., et al.," Jails: Confining the omnipotent root", May 22, 2000, XP002257980, Internet Citation http://www.nluug.nl/events/sane2000/papers/kamp.pdf (15 pages).

* cited by examiner

100

ELECTRONIC APPARATUS AND CONTROLLING METHOD THEREOF

CROSS-REFERENCE TO RELATED APPLICATIONS

This application claims priority from Korean Patent Application No. 10-2018-0117975, filed on Oct. 4, 2018, in the Korean Intellectual Property Office, the disclosure of which is herein incorporated by reference in its entirety.

BACKGROUND

1. Field

The disclosure relates to an electronic apparatus and a controlling method thereof. More particularly, the disclosure relates to an electronic apparatus capable of isolating an application suspicious to be malicious and a controlling method thereof.

2. Description of the Related Art

With the development of electronic communication technology, users have been allowed to utilize various functions with mobile phones. In particular, unlike in conventional mobile phones in which given functions are used, various applications can be downloaded and installed in a smartphone through an application market. Among such applications, there are programs that perform malicious actions requiring personal information, generating fraudulent charges, and the like without a user's consent. Various malicious applications for smartphones have been registered in application markets, and users install the applications without being aware. Mobile computing devices such as mobile phones (e.g., smartphones), tablet personal computers (PCs), or the like that may have installed or downloaded a malicious application may cause great damage because the mobile computing devices may contain sensitive personal information.

To prevent such damage, technology preventing malicious applications from negatively affecting devices or data has emerged. The technology includes Linux Containers (LXC), Docker for Windows operating systems, Rocket which is a standards-based application program container technology, or the like. In case of mobile devices, there are Samsung's KNOX (a leading mobile security solution that provides a secure environment for corporate data and apps for all Galaxy devices), McAfee Secure Container for Android developed by Intel Corporation, or the like. These technologies are called container technologies and allow applications to be executed in an isolated environment for security.

A container technology is configured to use the same operating system in all containers on devices, and specific application programs are configured to be executed in a specific container. Since data isolation is provided by a container, the data belongs to an application program executed inside the container and may not be accessed by an application executed outside the container or in another container, and an application executed inside the container may not access data of other application programs.

However, in a mobile environment, overhead costs become a big problem when operating such container. In addition, when malicious applications and non-malicious applications coexist in one container, the malicious application may negatively affect other applications (e.g., the non-malicious application), but there was no way to deal with that issue. In addition, there were problems that an application in the container could not be taken out of the container or a load of the application was too large to migrate.

SUMMARY

The disclosure is directed to solving the problems described above, and a purpose of the disclosure is to provide an electronic apparatus that proceeds with minimal work for dynamical isolation during execution of an application, thereby having little overhead, being capable of dynamically isolating a suspicious application in a device during operation, and returning the isolated application to its original environment and a controlling method thereof.

An aspect of the embodiments relates to a controlling method of an electronic apparatus including monitoring whether there are malicious actions on a plurality of running applications, detecting a suspicious application among the plurality of running applications on the basis of the monitoring result, isolating the suspicious application by blocking communication with other applications stored in the electronic apparatus and access to a shared directory, and based on the suspicious application being identified not to be malicious after isolating the suspicious application, releasing the isolation for the suspicious application.

An aspect of the embodiments relates to an electronic apparatus including a memory configured to store computer executable instructions, and by executing the computer executable instructions, a processor configured to monitor whether there are malicious actions on a plurality of running applications, detect a suspicious application among the plurality of applications on the basis of the monitoring result, isolate the suspicious application by blocking communication with other applications stored in the electronic apparatus and access to a shared directory, and based on the suspicious application being identified not to be malicious after isolating the suspicious application, release the isolation for the suspicious application.

An aspect of the embodiments relates to a controlling method of an electronic apparatus including monitoring whether an application executed by the electronic apparatus performs a potentially malicious action; detecting that the application is a suspicious application based on the monitoring of the potentially malicious action. The isolating of the suspicious application may include at least one of: blocking communication with other applications executed by the electronic apparatus or blocking access to a shared memory of the electronic apparatus. The controlling method may further include based on identifying the potentially malicious action of the suspicious application is not malicious after isolating the suspicious application, releasing the isolating of the suspicious application.

The method, according to an aspect of the embodiments, may include the application executed by the electronic apparatus having a different mount namespace set than another application executed by the electronic apparatus. The method, according to an aspect of the embodiments, may include the isolating comprises changing a mount point of the mount namespace set for the suspicious application from the shared memory to a dummy directory, and blocking the suspicious application from accessing the shared memory.

The method, according to an aspect of the embodiments, may include the releasing the isolation comprises changing the mount point of the mount namespace set for the suspicious application from the dummy directory to the shared memory (or shared directory).

The method, according to an aspect of the embodiments, may include the isolating comprises blocking communication between the suspicious application and the other applications by setting an identifier (ID) of an inter-process communication (IPC) namespace predetermined for the suspicious application. The method, according to an aspect of the embodiments, may include the ID of the predetermined IPC namespace is different from an IPC namespace ID set for an application identified not to be performing any potentially malicious actions.

The method, according to an aspect of the embodiments, may include the releasing the isolation comprises changing the ID of the IPC namespace of the suspicious application to the IPC namespace ID set for the application identified not to be performing any potentially malicious actions.

The method, according to an aspect of the embodiments, may include the detecting comprises detecting actions of each of a plurality running applications, and based on a result of comparing the detected actions to a predetermined pattern of malicious actions, detecting the suspicious application among the at plurality of running applications.

The method, according to an aspect of the embodiments, may include the releasing of the isolating comprises, based on actions of the suspicious application being detected to correspond to a user's intention after the isolating of the suspicious application, identifying that the suspicious application is not malicious.

The method, according to an aspect of the embodiments, may include displaying a user interface (UI) indicating the isolating of the suspicious application based on the suspicious application being isolated.

The method, according to an aspect of the embodiments, may include displaying a user interface (UI) indicating the release of the isolating of the suspicious application based on the isolating of the suspicious application being released.

The method, according to an aspect of the embodiments, may include releasing the isolation comprises, based on the suspicious application being identified not to be malicious after isolating of the suspicious application, displaying a user interface (UI) asking whether to release the isolating of the suspicious application, and based on a user consent being input, releasing the isolating of the suspicious application.

An aspect of the embodiments relates to an electronic apparatus including a memory configured to store computer executable instructions; and a processor configured to execute the computer executable instructions, which cause the processor to: monitor whether an application executed by the electronic apparatus performs a potentially malicious action, detect that the application is a suspicious application based on the monitoring of the potentially malicious action, isolate the suspicious application, wherein the isolating of the suspicious application includes at least one of: blocking communication with other applications executed by the electronic apparatus or blocking access to a shared memory, and based on identifying the potentially malicious action of the suspicious application is not malicious after isolating the suspicious application, release the isolating of the suspicious application.

DETAILED DESCRIPTION OF EMBODIMENTS

Figure 1:
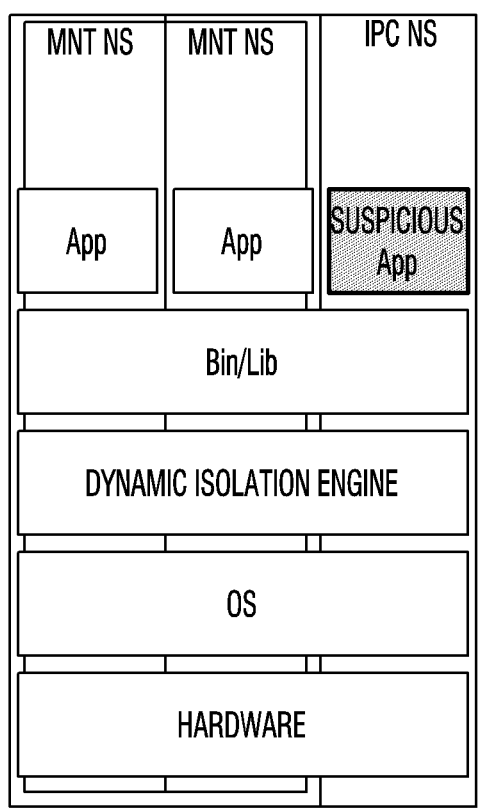
FIG. 1 shows a hierarchical structural view of an electronic apparatus according to an embodiment.

Hereinafter, the disclosure will be described with reference to the accompanying drawings. However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

The terms "have", "may have", "include", and "may include" used in the embodiments of the disclosure indicate the presence of corresponding features (for example, elements such as numerical values, functions, operations, or parts), and do not preclude the presence of additional features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

In the exemplary embodiment of the disclosure, the term "module," "unit," or "part" is referred to as an element that performs at least one function or operation, and may be implemented with hardware, software, or a combination of hardware and software. In addition, a plurality of "modules," a plurality of "units," a plurality of "parts" may be integrated into at least one module or chip except for a "module," a "unit," or a "part" which has to be implemented with specific hardware, and may be implemented with at least one processor.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled with/to" or is "directly connected to" another element (e.g., second element), it should be understood that there is no other element (e.g., third element) between the certain element and the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, the phrase "processor configured to (set to) perform A, B, or C" may refer to a dedicated processor (e.g., an embedded processor) for performing the corresponding operations, or a generic-purpose processor (e.g., a CPU or an application processor) capable of executing the corresponding operations by executing one or more software programs stored in a memory device.

An application according to embodiments refers to software executed on an operating system for a computer or a mobile OS to be used by a user. For example, the application may include a web browser, a camera application, mobile payment application (or electronic payment application, payment application), photo album application, word processor, spread sheet, contacts application, calendar application, memo application, alarm application, Social Network System (SNS) application, call application, game store, game application, chatting application, map application, music player, video player, or the like.

The application according to embodiments may refer to software that is executed on an electronic apparatus or an external device (for example, a wearable device, a server, or the like) which is connected wirelessly or by wire (or by both wirelessly or by wire).

An electronic apparatus according to various embodiments of the disclosure may include, for example, at least one of a smartphone, a tablet Personal Computer (PC), a mobile phone, a video phone, an e-book reader, a desktop Personal Computer(PC), a laptop Personal Computer(PC), a net book computer, a workstation, a server, a Personal Digital Assistant (PDA), a Portable Multimedia Player (PMP), an MP3 player, a mobile medical device, a camera, and a wearable device. According to various embodiments, the wearable device may include at least one of accessory (e.g., watches, rings, bracelets, anklets, necklaces, eyeglasses, contact lenses, or head-mounted-device (HMDs)), textiles or clothing integrated type (e.g., electronic clothing), body-attachable type (e.g., skin pad or tattoo), or living implantable type (e.g., implantable circuit).

According to a certain embodiment, the electronic apparatus may be a home appliance. For example, the home appliance may include at least one of a television, a digital video disk (DVD) player, an audio, a refrigerator, an air conditioner, a vacuum cleaner, an oven, a microwave, a washing machine, an air purifier, a set-top box, a home automation control panel, a security control panel, a TV box (e.g., Samsung HomeSync™, Apple TV™, or Google TV™), a game console (e.g. Xbox™, PlayStation™), an electronic dictionary, an electronic key, a camcorder, or an electronic picture frame.

According to another embodiment, the electronic apparatus may include at least one of any type of medical device (e.g., all types of portable medical measuring devices, such as a blood glucose meter, a heart rate monitor, a blood pressure monitor, a body temperature meter, or the like, a magnetic resonance angiography (MRA), a magnetic resonance imaging (MRI), a computed tomography (CT), a camera, or an ultrasound device, or the like), a navigation device, a global navigation satellite system (GNSS), an event data recorder (EDR), a flight data recorder (FDR), an automotive infotainment device, a ship electronic equipment (e.g., a ship navigation system, a gyro compass, etc.), avionics, a security device, a head unit for a vehicle, an industrial or home robot, automatic teller's machines (ATM) at financial institutions, a point of sale (POS) in stores, or an Internet of Things (IoT) device (e.g., a light bulb, a sensor, an electric or a gas meter, a sprinkler device, a fire alarm, a thermostat, a street light, a toaster, sporting goods, a hot water tank a heater, or a boiler, or the like).

According to another embodiment, the electronic apparatus may include at least one of furniture or a part of a building/structure, an electronic board, an electronic signature receiving device, a projector, or various measuring devices (e.g., water, electricity, gas, or an electric wave measuring device, or the like). In various embodiments, the electronic apparatus may be a combination of one or more of the above-described devices. In a certain embodiment, the electronic apparatus may be a flexible electronic apparatus. Further, the electronic apparatus according to the embodiments of the disclosure is not limited to the above-described devices, but may include new electronic apparatuses in accordance with the technical development.

The terms used in the description are used to merely describe a specific embodiment, but do not intend to limit the scope of other embodiments. Unless otherwise defined specifically, a singular expression may encompass a plural expression. All terms (including technical and scientific terms) used in the description could be used as meanings commonly understood by those ordinary skilled in the art to which the disclosure belongs. The terms that are used in the disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the disclosure should not be interpreted as excluding the embodiments of the disclosure. Like reference numerals proposed in each drawing denote like components.

The disclosure will be described in greater detail with reference to the accompanying drawings.

Figure 2:
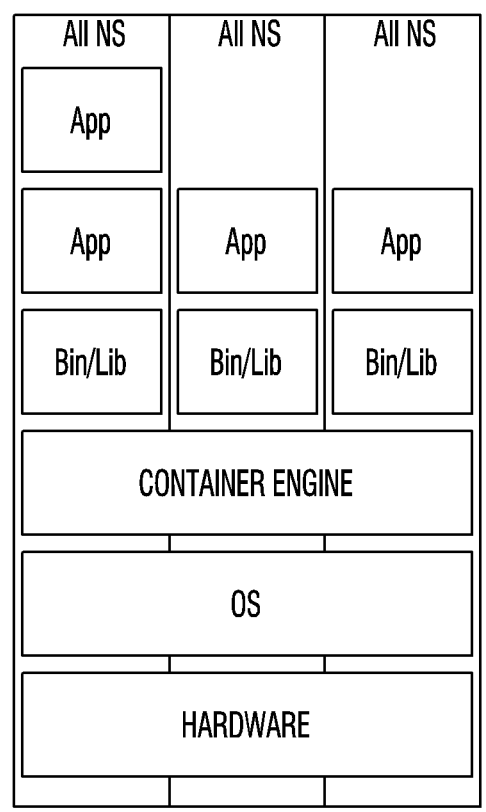
FIG. 2 shows a hierarchical structural view of an electronic apparatus according to a conventional art.

FIG. 1 shows a conceptual diagram of an electronic apparatus according to an embodiment performing dynamic isolation when an application is executed. FIG. 2 shows a conceptual diagram of the electronic apparatus according to the conventional art for comparing the disclosure with the conventional art.

Before describing the disclosure, the following is a brief description of namespace technology. A namespace is a kind of virtualization technology that is performed in one system but provides an isolated environment as if there are separate spaces. The namespace is structurally different from hypervisor which is a virtualization technology. The hypervisor virtualizes hardware resources. Virtualized hardware is provided on a number of guest's operating system (OS) on the hypervisor, so each guest OS is separated into a completely different environment. However, the namespace is not hardware resource-level virtualization, operates on the same OS and the same kernel, and provides an isolated service environment of each.

Both Linux Containers (LXC), a container-based virtualization technology, and Docker, a source container technology designed for the Windows operating system, are made based on namespaces. The container technology for embedded devices such as a mobile computing device includes KNOX developed by Samsung and McAfee Secure Container for Android developed by a subsidiary of Intel Corporation.

Among various types of namespaces, an inter-process communication (IPC) namespace, for example, isolates communication between processes. For another example, a Process ID (PID) namespace divides and manages process identifiers within each namespace. For another example, a network namespace may isolate a network interface. For another example, a mount namespace may divide and isolate a mount point of a file system. For another example, a USER namespace isolates a host name of a system by namespace.

Referring to FIG. 2, conventionally, all namespaces (ALL NS) (e.g., IPC namespace, PID namespace, network namespace, mount namespace, USER namespace) were separated to create containers, and an application was put in each container. This method has a disadvantage in that overhead is large when operating a container especially in a mobile environment. That is, all namespaces should be separated to proceed, and additional actions (for example, should be executed again from Init process (short for initialization process)) according to the separation of the namespace should be taken. In addition, in the case of the container technology, there is a problem that an application in the container may not be taken out of the container or load for taking it out is large.

On the other hand, according to an embodiment, instead of separating all namespaces from the beginning, security may be ensured when executing by separating the namespaces (e.g., separating the mount namespace only and separating dynamically the IPC namespace).

As a specific example, according to an embodiment, at least one of: access to a shared directory may be blocked based on the mount namespace, and communication with other applications may be blocked based on the IPC namespace.

Blocking access to the shared directory may be performed in the following manner. As illustrated in FIG. 1, each application may be firstly separated into a different mount namespace (MNT NS). Each application may have access to a shared directory with a separate mount namespace and may be normally executed. As such, when a malicious action is detected during normal execution, an application that the malicious action is detected may be separated as a suspicious application, and a dummy mount may be proceeded for the suspicious application except for a unique file system used by the suspicious application.

Blocking communication with other applications may be performed in the following manner. Firstly, as illustrated in FIG. 1, an isolated IPC namespace (IPC NS) may be generated and the suspicious application may be migrated to the isolated IPC namespace by detecting the malicious actions in real time during execution of the application. The application of the isolated IPC namespace may be blocked from communicating with another application of another IPC namespace.

According to embodiments described above, there is little overhead because the application may be isolated by performing a minimal amount of work using the mount namespace and the IPC namespace. In addition, since the isolation of the application may be dynamically performed, the application may be isolated in real time. Also, the isolated application may be returned to its original circumstance according to circumstances.

Figure 3:
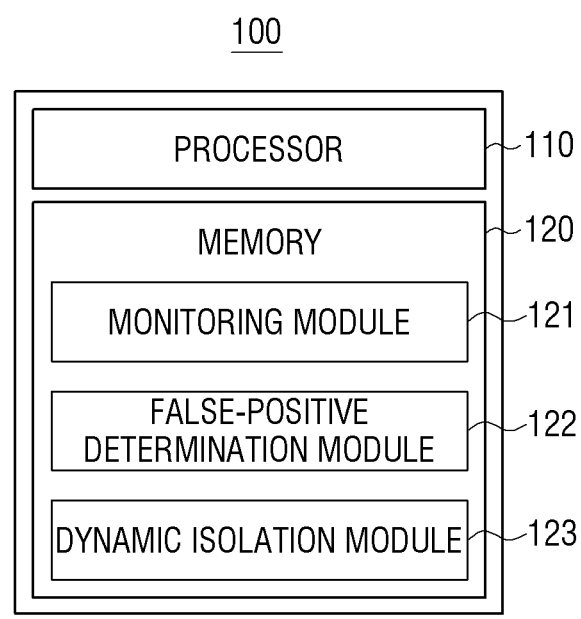
FIG. 3 shows a block diagram illustrating a composition of an electronic apparatus according to an embodiment.

FIG. 3 is a block diagram illustrating an example of a basic configuration of an electronic apparatus according to various embodiments.

Referring to FIG. 3, an electronic apparatus 100 may include a processor 110 and a memory 120.

The processor 110 may be configured to control the overall operations of the electronic apparatus 100. The processor 110 may control a signal flow between internal components of the electronic apparatus 100, and may perform a function that processes data. The processor 110 may, for example, control a number of hardware or software elements connected to the processor 110 by driving an operating system or application, and may perform various data processing and calculations. The processor 110 may be implemented as at least one of a general processor, a digital signal processor, an application specific integrated circuit (ASIC), a system on chip (SoC), a microcomputer (MICOM), or the like.

The memory 120 may store various data, programs or applications which are used to drive and control the electronic apparatus 100. The memory 120 may include internal memory or external memory.

The internal memory may, for example, include at least one of volatile memory (e.g., dynamic random access memory (RAM) (DRAM), a static RAM (SRAM), or a synchronous dynamic RAM (SDRAM), etc.), non-volatile memory (e.g., one-time programmable read-only memory (ROM) (OTPROM), a programmable ROM (PROM), an erasable and programmable ROM (EPROM), an electrically erasable and programmable ROM (EEPROM), a mask ROM, a flash ROM, or a flash memory (such as NOT AND (NAND) flash, NOT OR (NOR) flash, etc.), a hard drive, or a solid state drive (SSD).

The external memory may include a flash drive, for example, a compact flash (CF), a secure digital (SD), Micro-SD, Mini-SD, an extreme digital (XD), a multi-media card (MMC) or a memory stick or the like. The external memory may be connected functionally and/or physically to the electronic apparatus 100 through a variety of interfaces.

The memory 120 may be accessed by the processor 110, and perform read-out, recording, correction, deletion, and/or update, and the like, on data by the processor 110. The term memory as used herein may include the memory 120, a ROM, and a RAM within the processor 110, or a memory card mounted on the electronic apparatus 100 (e.g., micro SD card, memory stick).

The memory 120 may store computer executable instructions for performing a controlling method of the electronic apparatus as illustrated herein.

The memory 120 may include software and/or firmware configured as one or more modules. The one or more modules may correspond to a set of computer executable instructions.

According to an embodiment, the memory 120 may include one or more of: a monitoring module 121, a false-positive determination module 122, and a dynamic isolation module 123. The modules 121, 122 and 123 may be executed by the processor 110 to perform a variety of functions.

The monitoring module 121 may monitor in real time whether there are potentially malicious actions on one or the plurality of running applications. The monitoring module 121 may detect one or more actions of an application as being potentially malicious, and detect whether the corresponding suspicious application is malicious by comparing the detected one or more actions with a predetermined pattern of malicious actions.

As an example of a detecting method for actions of an application, the monitoring module 121 may detect actions by collecting an event at a kernel level. As another example, the monitoring module 121 may detect actions of an application based on an application programming interface (API) called by the application. For example, the monitoring module 121 may monitor the API called by the application in real time, and detect actions by combining names of the APIs in calling sequence.

The predetermined pattern of malicious actions may, for example, include one or more of: an address book leakage, message leakage, a photo leakage, causing fraudulent charges, transferring of unencrypted personal information to the network, persistent connections with specific servers (secure shell (SSH) sessions), persistent attempts to encrypt (suspicious as ransomware) for directory files, an increase of rapid network communication, persistent attempts to change system permissions and files, forcibly shutting down other applications, endless network attempts by unauthorized network applications, causing use of cellular data, sending spam messages, sending coordinate information to the network by unauthorized GPS applications, constantly accessing certain illegal overseas websites, making international calls, or running out of batteries, or the like.

Information about such predetermined pattern of malicious actions may be stored in the memory 110 and compared with actions of an application currently being executed.

In addition, the monitoring module 121 may use various algorithms for monitoring an existing application.

Meanwhile, even an application that has acted based on the pattern of malicious actions may not actually be a malicious application. In other words, a false-positive may occur.

There may be two main causes of the false-positive. Firstly, there may be malicious actions which were actually intended by a user. Secondly, there may be abnormal actions due to unskilled application developers in their design or development. For example, when personal information is input to a financial application, if it is a normal case, the application should encrypt the personal information and send it to a server, but if not encrypted, it may be classified as a malicious suspicious application by the monitoring module 121.

The false-positive determination module 122 may detect such false-positive situations.

Accordingly, the monitoring module 121 may firstly detect an application that has performed actions corresponding to the pattern of malicious actions as a suspicious application. The suspicious actions may be identified to be malicious by the false-positive determination module 122. On the other hand, when the suspicious application keeps performing the malicious actions, the suspicious module 121 may detect the suspicious application as a malicious application which is at a higher level than the suspicious application. That is, the suspicious application and the malicious application are separated, thereby opening up the possibility of a false-positive identification for the suspicious application. The processor 110 may store a list of the suspicious applications and a list of the malicious applications in the memory 120.

According to an embodiment, the false-positive determination module 122 may detect whether the actions of the suspicious application corresponds to a user's intention, and identify the suspicious application is not malignant (malicious) based on detecting that the suspicious actions correspond to the user's intention.

As a specific example, prior to the suspicious actions of the suspicious application, the false-positive determination module 122 may detect whether the suspicious actions correspond to the user's intention, based on whether a user input related to the suspicious actions has been obtained. The user input may be detected based on, for example, a key event or a touch event generated by the user through an input interface of the electronic apparatus 100.

For example, the suspicious actions may be identified as malicious actions based on unencrypted personal information being transmitted to the network through an application, but the suspicious action(s) may be identified to be a false-positive based on the user inputting personal information. For another example, based on an application continuously establishing an SSH session with a specific server, suspicious actions may be identified, but based on confirming that a large file is being transmitted or obtained by the user's intention, the suspicious actions may be identified as a false-positive.

The false-positive determination module 122 may identify the false-positive by such an analysis itself as described above, or may, according to another embodiment, request identification from a user. For example, the false-positive determination module 122 may provide (e.g., via a user interface (UI) display, an alarm through a speaker, etc.) the user with an alarm, and based on a negative response to the alarm being obtained from the user, may detect the suspicious actions correspond to the user's intention and may identify that the suspicious actions of the corresponding application is not a malignant action.

The dynamic isolation module 123 may isolate an application which is suspicious as a malignant and may release the isolation of an application identified as a false-positive among the isolated applications.

In specific, the dynamic isolation module 123 may isolate and release an application based on information obtained from the monitoring module 121 and the false-positive determination module 122.

The dynamic isolation module 213 may isolate a malignant application by blocking communication with other applications stored in the electronic apparatus and by blocking access to a shared directory.

The dynamic isolation module 213 may use the IPC namespace to block communication with other applications. For example, the dynamic isolation module 213 may set an identifier (ID) of an IPC namespace predetermined for a suspicious application and block communication between the suspicious application and other applications. The ID of the predetermined IPC namespace herein may be different from an ID of an IPC namespace of an application which is identified as not performing malicious (malignant) actions.

The dynamic isolation module 213 may firstly set a different mount namespace for each of a plurality of applications to block access to the shared directory. Then, based on a suspicious application being detected, the dynamic isolation module 213 may change a mount point of the mount namespace set for the suspicious application from the shared directory to the dummy directory, and block access to the shared directory of the suspicious application. Changing to the dummy directory may include changing a shared directory reference address to a fake address.

Then, based on identifying that the suspicious application is not a malignant action, after the isolation of the suspicious application, the dynamic isolation module 123 may release the isolation for the suspicious application.

According to an embodiment, the dynamic isolation module 123 may change the mount point of the mount namespace set for the suspicious application from the dummy directory to the shared directory. In addition, the dynamic isolation module 123 may change the ID of the IPC namespace of the suspicious application to the IPC namespace ID set for the application that has been found not to perform malicious actions. This may release the isolation for the suspicious application.

The processor 110 may monitor whether there are potentially malicious actions on one or a plurality of running applications by executing modules stored in the memory 120, which correspond to a set of computer executable instructions. The executing modules may also include: detect a suspicious application among the plurality of applications on the basis of the monitoring result, isolate the suspicious application by blocking communication with other applications stored in the electronic apparatus 100 and a shared directory, and release the isolation for the suspicious application based on identifying that the suspicious application is not malignant.

In the embodiments described above, it is described that although the electronic apparatus 100 monitors potentially malicious actions for an application and performs a false-positive determination or the like, such functions may be processed in an external device (e.g., a server). In this case, the electronic apparatus 100 may obtain a monitoring result, and a false-positive determination result, or the like from the external device to isolate the application or release the isolation.

Figure 4:
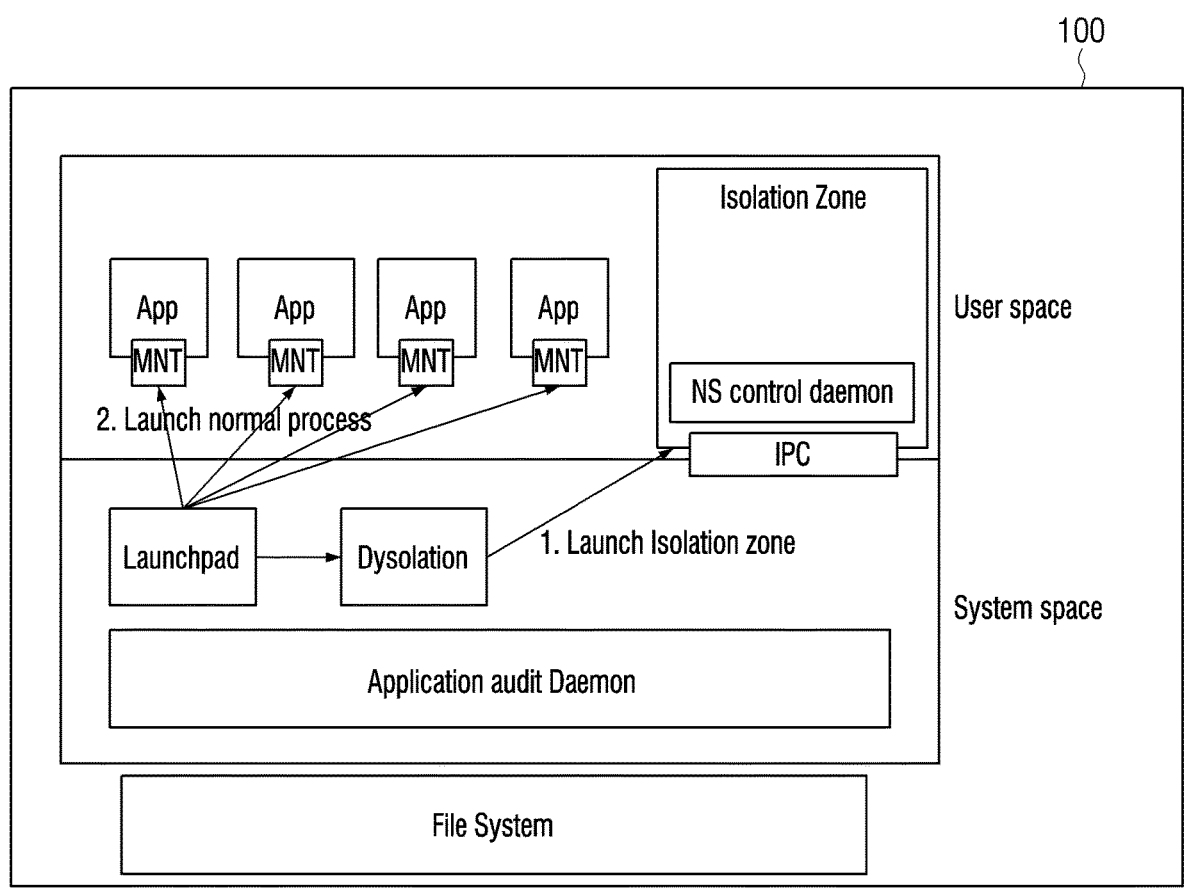
FIGS. 4 and 5 show views illustrating an example of an isolating method for an application.
Figure 5:
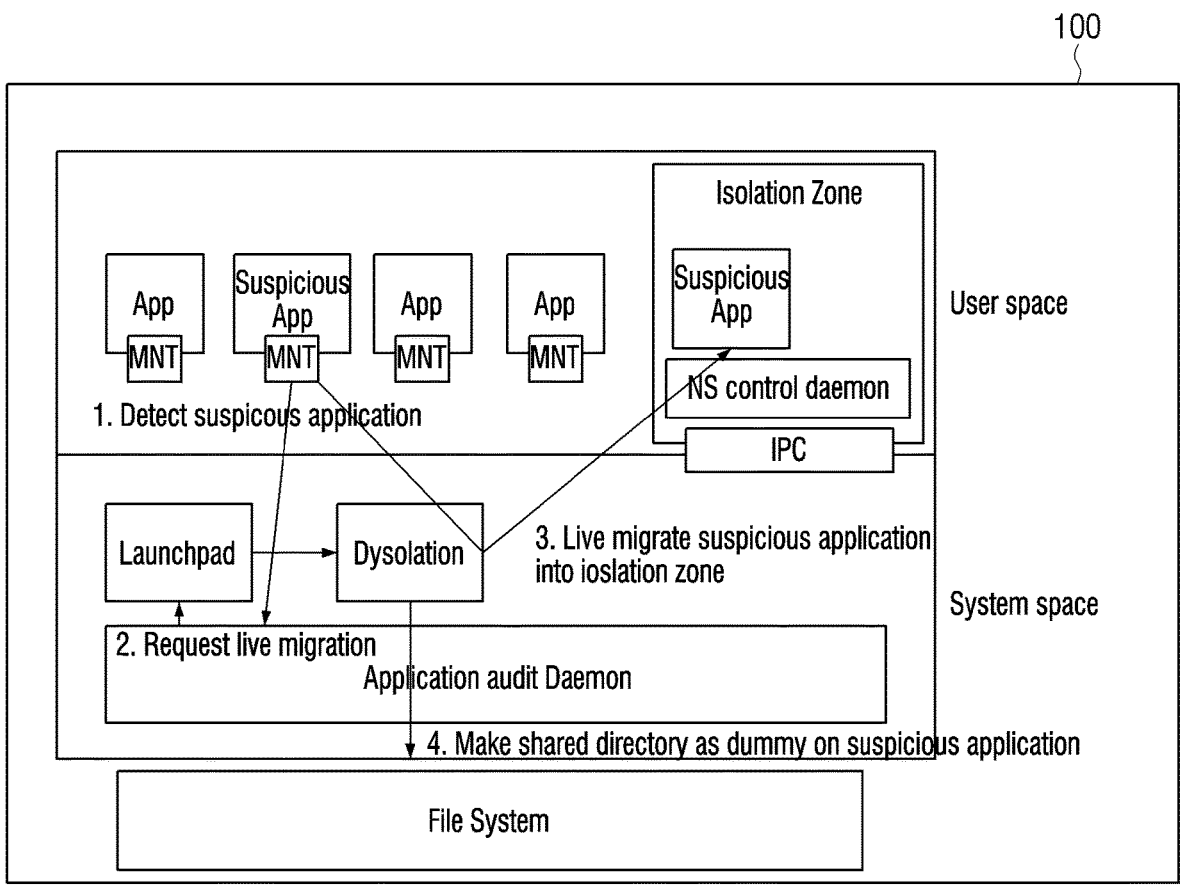

FIGS. 4 and 5 show views illustrating an example of an isolating method for an application of the electronic apparatus 100. 'MNT' stands for a mount namespace and 'NS' stands for a namespace. A 'dysolation' is a compound word using dynamic and isolation, and may correspond to the dynamic isolation module.

Referring to FIG. 4, the electronic apparatus 100 may perform an operation in the following order (although a different order may also be performed).

1. Based on a device being booted up, an isolation zone may be organized. An ID of a predetermined IPC namespace may be assigned to the isolation zone.

2. When running an application, mount namespaces may be separately operated.

Hereinafter, an operation based on a suspicious application being detected will be described with reference to FIG. 5. Referring to FIG. 5, the electronic apparatus 100 may perform an operation in the following order (although a different order may also be performed).

1. During execution of an application, the electronic apparatus may detect a suspicious application in real time.

2. The electronic apparatus may request to isolate the suspicious application in real time.

3. The electronic apparatus may proceed the isolation of the suspicious application in real time on the request. As a specific example, the electronic apparatus may restrict the suspicious application from communicating with other applications (separation of an IPC namespace)

4. In addition, the electronic apparatus may restrict access to a file system except for a native directory of the suspicious application (dummy bind-mount)

Figure 6:
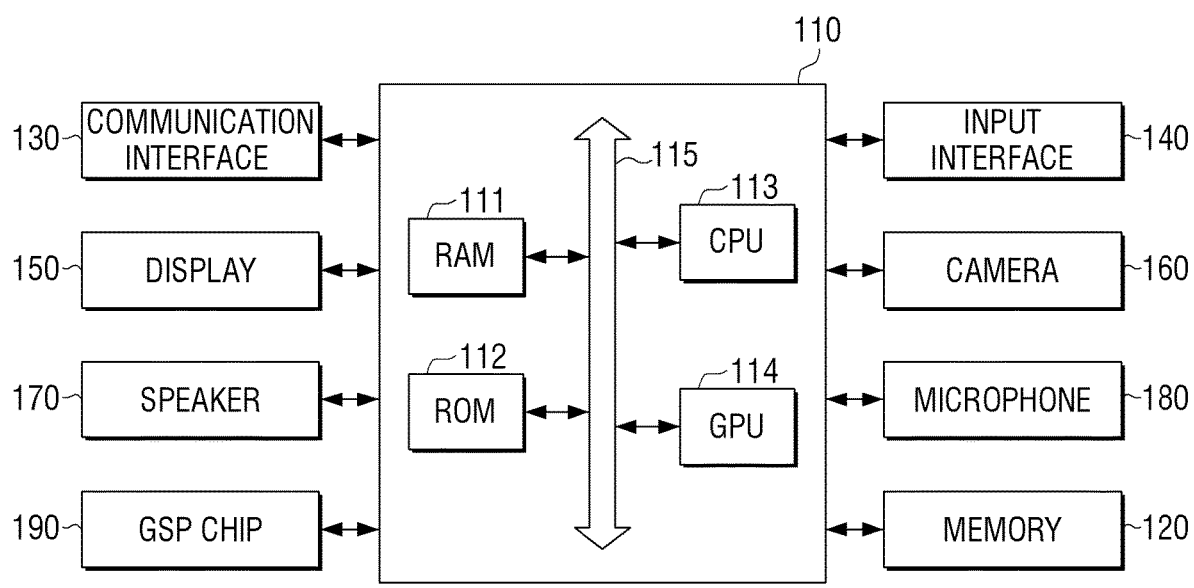
FIG. 6 shows a block diagram illustrating a composition of an electronic apparatus according to an embodiment.

FIG. 6 shows a view illustrating another configuration of the electronic apparatus according to the disclosure.

Referring to FIG. 6, the electronic apparatus 100 may include one or more of a processor 110, a memory 120, a communication interface 130, an input interface 140, a display 150, a camera 160, a speaker 170, a microphone 180 and a GPS chip 190. Although not illustrated in accordance with a form of the embodiment, appropriate hardware/software configurations that are obvious to those skilled in the art may be further included in the electronic apparatus 100. In addition, some configurations may be excluded depending on the form of the embodiment.

The communication interface 130 may, for example, be connected to a network to communicate with an external device via wireless communication or wired communication. The wireless communication may, for example, use at least one among long-term evolution (LTE), LTE Advance (LTE-A), code division multiple access (CDMA), wideband CDMA (WCDMA), universal mobile telecommunications system (UMTS), Wireless Broadband (WiBro), Global System for Mobile Communications (GSM), or the like. In addition, wireless communication, for example, may include short distance communication. Short distance communication may, for example, include at least one of Wireless fidelity direct (WiFi direct), Bluetooth, near field communication (NFC), or Zigbee. Wired communication may, for example, include at least one of universal serial bus (USB), high definition multimedia interface (HDMI), recommended standard-232 (RS-232), or plain old telephone service (POTS). Network may, for example, include at least one of telecommunications network, computer network (e.g., local area network (LAN) or wide area network (WAN)), the Internet, or a telephone network.

The input interface 140 may obtain a user input and transmit it to the processor 110. The input interface 140 may, for example, include one or more of: a touch sensor, a (digital) pen sensor, a presser sensor, or a key. The touch sensor may, for example, use at least one of an electrostatic type, a pressure sensitive type, an infrared type, or an ultraviolet type. The (digital) pen sensor may, for example, be a part of a touch panel or include an additional sheet for recognizing use. The key, for example, may include at least one of a physical button, an optical key, or a keypad.

The display 150 may be a configuration (e.g., a screen) for outputting an image. The display 150, for example, may be implemented as a liquid crystal display (LCD), a light-emitting diode (LED) display, an organic light-emitting diode (OLED) display, an active-matrix organic light-emitting diode (AMOLED), a passive-matrix OLED (PMOLED), microelectromechanical systems (MEMS), or an electronic paper display, or the like. A touch sensor of the display 150 and the input interface 140 may have a mutual layer structure and be implemented as a touch screen.

The camera 160 may photograph at least one of a still image or a moving image according to a user's control. The camera 160 may be implemented as a plurality of cameras such as a front camera and a back camera. A specific application may access a photo, a video or the like according to an access authority. If the corresponding application is isolated, access to the photo, video or the like may be blocked.

The speaker 170 may output audio. For example, the speaker 170 may output various information such as information about a suspicious application, isolation of the application, or release of the application or the like as sound.

The microphone 180 may generate (or convert) an electrical signal from a voice or sound (e.g., voice or sound obtained from an external source). The electrical signal generated from the microphone 180 may be stored in the memory 120 or output through the speaker 170. The microphone 180 may be composed of one or a plurality of microphones.

The GPS chip may be a constituent element that obtains a GPS signal from a Global Positioning System (GPS) satellite and that may calculate a current position of the electronic apparatus 100. A specific application may access the location information of the electronic apparatus 100.

Based on the corresponding application being isolated, access for the location information may be blocked.

A description of the processor 110 and the memory 120 may refer to the description of the processor 110 and the memory 120 of FIG. 3.

The processor 110 may include one or more of a RAM 111, a ROM 112, a central processing unit (CPU) 113, a graphic processing unit (GPU) 114, a bus 115. The RAM 111, the ROM 112, the CPU 113, the GPU 114, or the like may be connected to each other through the bus 115.

The CPU 113 may access the memory 120 to perform booting using the operating system (O/S) stored in the memory 120. The CPU 113 may perform various operations by using the various programs, contents, data, or the like stored in the memory 120.

The ROM 112 may store a set of commands for system booting. Based on a turn-on command being input and the power being supplied, the CPU 113 may copy the O/S stored in the memory 120 into the RAM 111 according to the command stored in the ROM 112, and may boot the system by executing the O/S. Based on the booting being completed, the CPU 113 may copy the various programs stored in the memory 112 to the RAM 111, and may perform various operations by implementing the programs copied to the RAM 111. Based on the booting being completed, the GPU 114 may display a UI and UI elements corresponding to the application stored in the memory 120 on the display 150.

The processor 110 may perform isolation for a suspicious application as described above.

According to an embodiment, the processor 110 may perform isolation by blocking access to a shared directory of the suspicious application.

The application may be blocked from accessing various information in the electronic apparatus by, for example, blocking access to the shared directory. Information that is blocked from access, for example, is a concept that includes not only information temporarily stored in the electronic apparatus 100, but also information temporarily generated and stored, and may be referred to as information stored in the electronic apparatus 10 or generated in the electronic apparatus 100. For example, location information obtained by the GPS chip 190 or motion sensing information of the electronic apparatus 100 may be included in the blocked information, and an address book (contact), a message, call list, photos/media/files, or the like may be included in the blocked information as well. In addition, blocked information may include not only information stored in an embedded memory in the electronic apparatus 100, but also information stored in an external storage (e.g., an SD card) connected to the electronic apparatus 100.

According to an embodiment, each of a plurality of running applications may have a different mount namespace set, and the processor 110 may change a mount point of a mount namespace set for a suspicious application from a shared directory to a dummy directory, and may block the suspicious application from access to the shared directory.

In such a case, when attempting to release the isolation for the suspicious application (e.g., the blocking), the processor 110 may change the mount point of the mount namespace set for the suspicious application from the dummy directory to the shared directory.

In addition, the processor 110 may block communication between the suspicious application and other applications by setting an ID of an IPC namespace predetermined for the suspicions application. The ID of the IPC namespace is different from an IPC namespace ID set for an application that has been found not to perform malicious actions.

In this case, when attempting to release the isolation for the suspicious application, the processor 110 may change the ID of the IPC namespace of the suspicious application to the IPC namespace ID set for the application that has been found not to perform malicious actions.

As one of methods for detecting suspicious applications, the processor 110 may detect actions of each of a plurality of running applications, and detect the suspicious applications among the plurality of running applications based on a result in comparison to the pattern of malicious actions that predetermines the detected actions.

In addition, after isolating the suspicious application, based on detecting that the actions of the suspicious application correspond to a user's intention, the processor 110 may identify that the suspicious application is not malicious (malignant).

When the suspicious application is isolated, the processor 110 may control the display 150 to display a UI indicating isolation of the suspicious application. An example of the UI indicating the isolation of the suspicious application is illustrated in FIG. 7.

Figure 7:
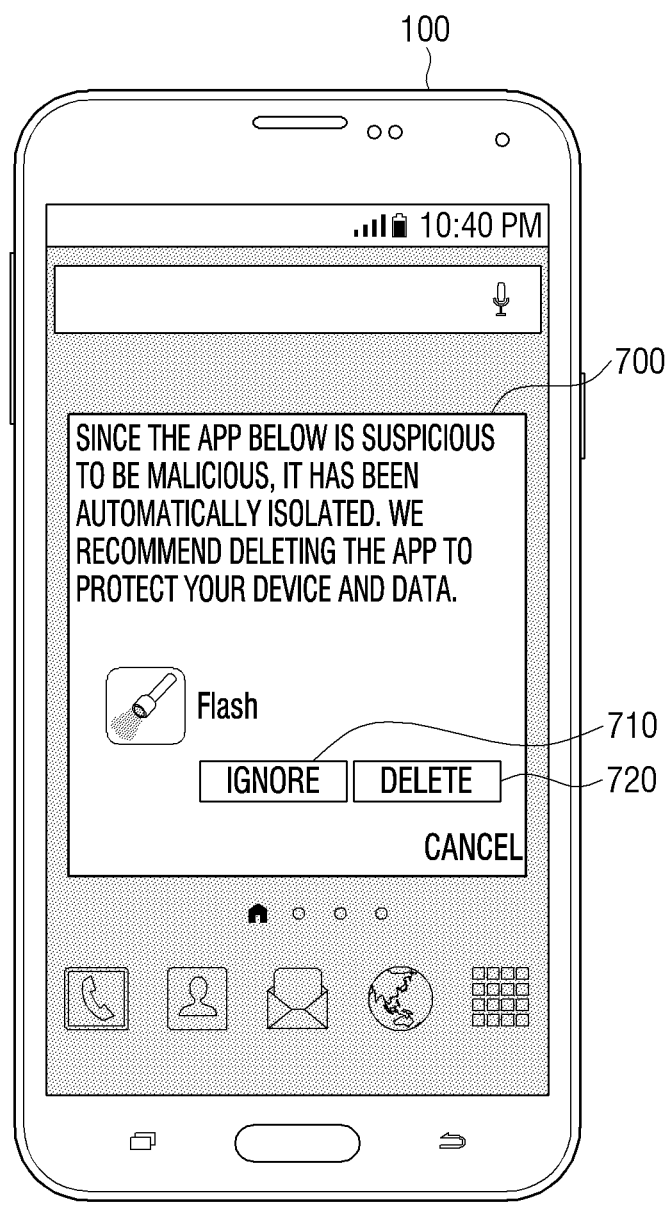
FIGS. 7, 8, 9, and 10 show views illustrating a user interface (UI) that may be provided in an electronic apparatus according to various embodiments.

FIG. 7 shows an illustration of an example of a UI indicating an isolation of a suspicious application that may be provided in the electronic apparatus 100.

Referring to FIG. 7, based on the suspicious application being isolated, the electronic apparatus 100 may display a UI 700 indicating the isolation of the suspicious application. The UI 700 may include a UI element 710 for accepting a user input of ignoring the indication and a UI element 720 for accepting a user input of deleting the application (to protect the user's device and data). The UI elements 710 and 720 may be buttons that may be touched or clicked to accept the corresponding user input. Based on the UI element 710 for ignoring being selected, the corresponding suspicious application may be executed, for example, executed in the isolation state. Based on the UI element 720 for deleting being selected, the corresponding suspicious application may be deleted.

Based on the isolation (e.g., blocking) for the suspicious application being released, the processor 110 may control the display 150 to display a UI indicating the releasement of the isolation for the suspicious application. An example of a UI indicating the release of the isolation for the suspicious application is illustrated in FIG. 8.

Figure 8:
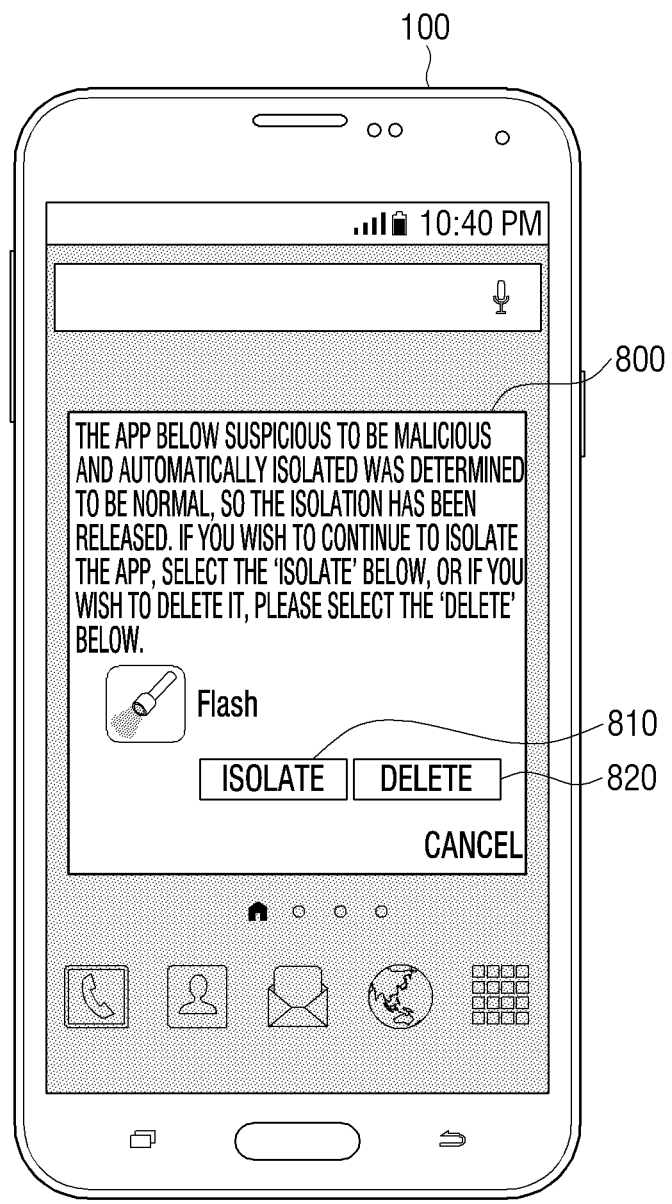

FIG. 8 shows an illustration of an example of the UI indicating the release of the isolation for the suspicious application that may be provided in the electronic apparatus 100.

Referring to FIG. 8, based on the isolation for the suspicious application being released, the electronic apparatus 100 may display a UI 800 indicating the release of the isolation for the suspicious application. The UI 800 may include a UI element 810 for accepting user input of continuing isolation and a UI element 820 for accepting user input for deleting the corresponding application, which may be a normal application (that was originally identified as suspicious). Based on the UI element 810 for isolating being selected, the release of the isolation may be canceled and the corresponding application may be continued to isolated again. Based on the UI element 820 for deleting being selected, the corresponding application may be deleted. The UI elements 810 and 820 may be buttons that may be touched or clicked to accept the corresponding user input.

After isolating the suspicious application, based on identifying that the suspicious application is not malicious, the processor 110 may control the display 150 to display a UI asking whether the isolation for the suspicious application can be released, and release the isolation for the suspicious application when a user consent is entered through the UI. That is, instead of immediately isolating the application, it may be isolated after asking the user. An example of the UI for asking whether to release isolation is illustrated in FIG. 9.

Figure 9:
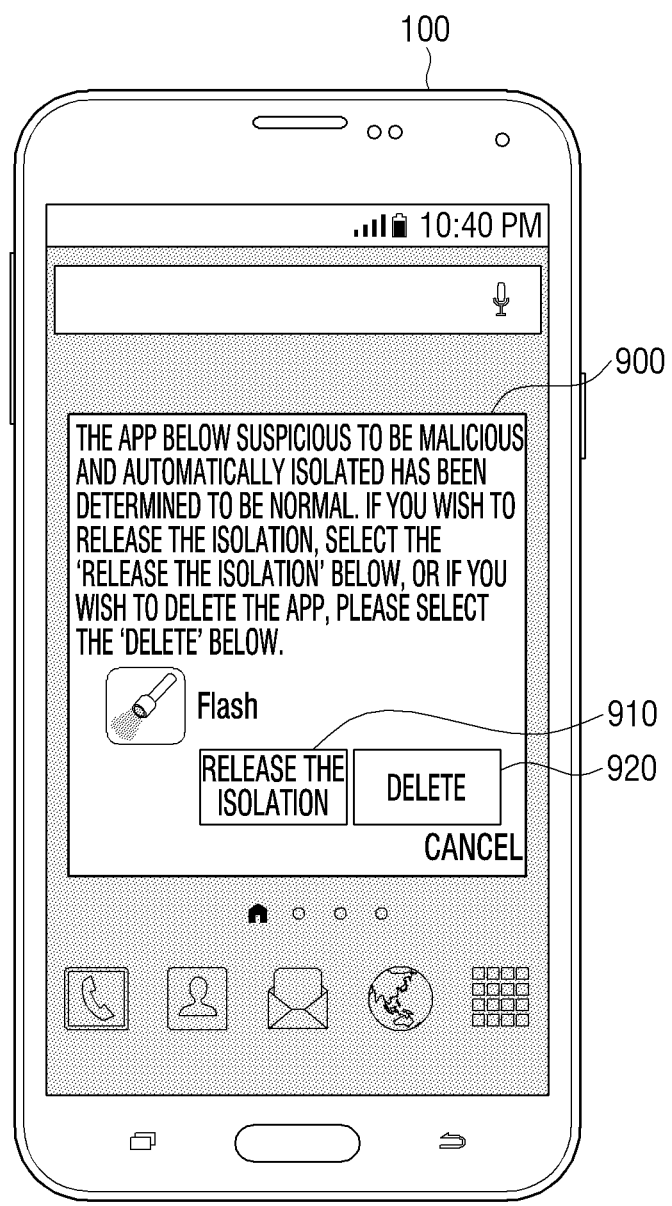

FIG. 9 shows an example illustrating a UI for identifying whether to release the isolation for the suspicious application.

Referring to FIG. 9, based on the suspicious application being found to be a false-positive, the electronic apparatus 100 may display a UI 900 asking whether to release the isolation for the suspicious application. The UI 900 may include a UI element 910 for accepting a user input of releasing the isolation and a UI element 920 for accepting a user input of deleting the corresponding application. Based on the UI element 910 for releasing the isolation being selected, the isolation for the suspicious application may be released. Based on the UI element 920 for deleting being selected, the corresponding application may be deleted.

The processor 110 may provide a UI for notifying the suspicious application, and identify the suspicious application as the false-positive based on a negative response for the UI being received from the user. An example of notifying the suspicious application is illustrated in FIG. 10.

Figure 10:
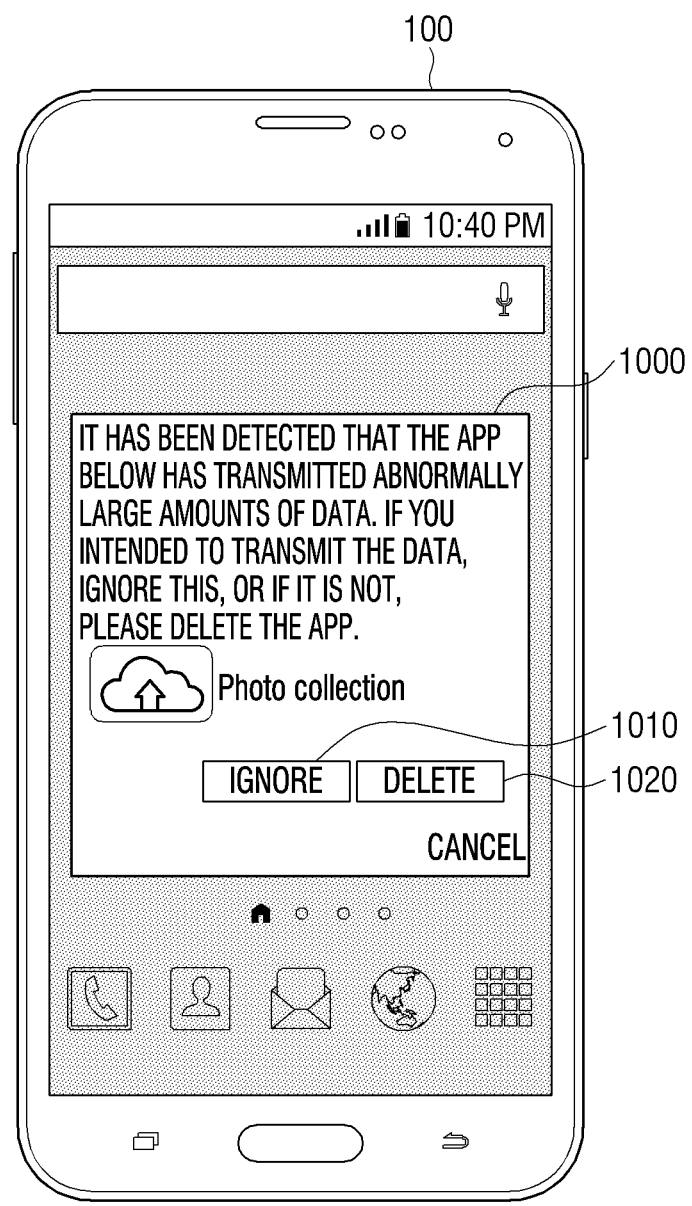

FIG. 10 shows a view illustrating an example of the UI notifying the suspicious application that may be provided in the electronic apparatus.

Referring to FIG. 10, based on the suspicious application being detected, the electronic apparatus 100 may display the UI notifying the suspicious application 1000. The UI 1000 may include a UI element 1010 for accepting a user input of ignoring and a UI element 1020 for accepting a user input of deleting the corresponding application. Based on the UI element 1010 for ignoring being selected, the processor 110 may identify the false-positive for the suspicious application. Based on the UI element 1020 for deleting being selected, the corresponding application may be deleted.

In regards to the "selecting" of the UI element(s) discussed above, selecting may correspond to a user input, such as, but not limited to any one of: pushing a button or clicking a (mouse) pointer is located above the button.

Figure 11:
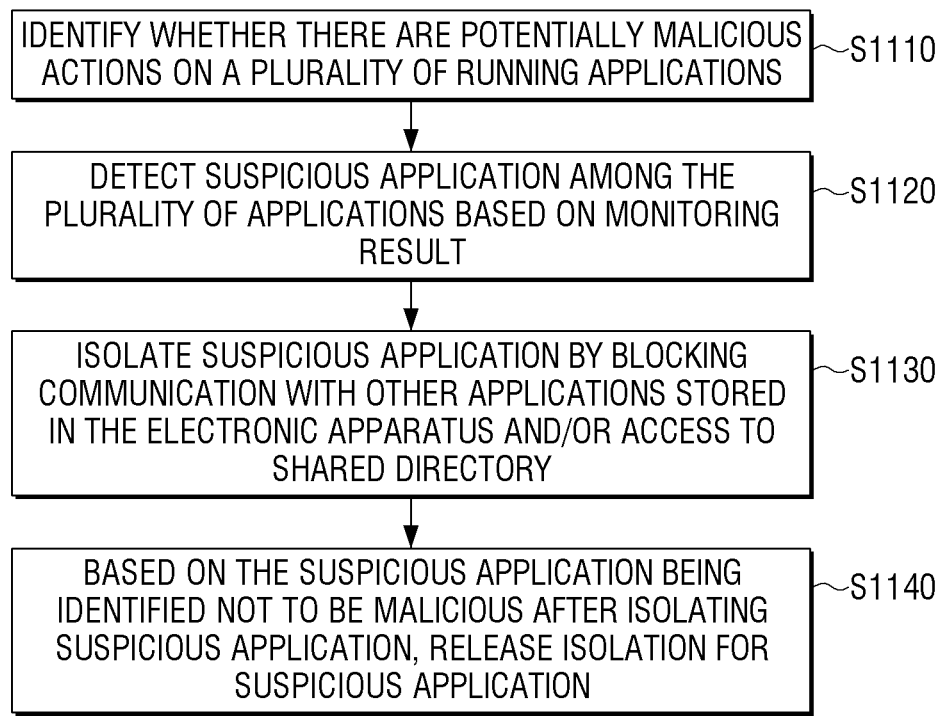
FIG. 11 shows a flowchart illustrating a controlling method of an electronic apparatus according to an embodiment.

FIG. 11 shows a flowchart illustrating a controlling method for the electronic apparatus according to an embodiment. The flowchart described in FIG. 11 may be configured with operations processed in the electronic apparatus 100 described herein. Thus, even contents are omitted hereinafter, the contents described with respect to the electronic apparatus 100 may be applied to the flowchart illustrated in FIG. 11.

Referring to FIG. 11, the electronic apparatus may monitor whether there are any potentially malicious actions on one or a plurality of running applications S1110.

The electronic apparatus 100 may based on identifying that there is a potentially malicious action on at least one of the at least one running application, detect that the at least one of the at least one running application is a suspicious application among the one or the plurality of applications based on the monitoring result S1120. In this case, the electronic apparatus 100 may detect each action of the one or the plurality of running applications, and detect the suspicious application among the one or the plurality of running applications based on a result of comparison between the detected actions and the predetermined pattern of malicious actions.

The electronic apparatus 100 may isolate the suspicious application. The isolating of the suspicious application may include one or more of: blocking communication with other applications stored in the electronic apparatus or blocking access to a shared directory S1130.

Each of the plurality of running applications may have a different mount namespace preset, and in S1130, may block access to the shared directory of the suspicious application by changing a mount point of a mount namespace set for the suspicious application to a dummy directory.

In addition, the applications may block communication between the suspicious application and other applications by setting an ID of an IPC namespace predetermined for the suspicious application. The ID of the predetermined IPC namespace is different from an IPC namespace set for an application that has been found not to perform malicious actions.

After isolating the suspicious application, when the suspicious application is identified not to be malicious, the electronic apparatus 100 may release the isolation for the suspicious application S1140.

In this case, based on detecting that actions of the suspicious application correspond to a user's intention after isolating the suspicious application, the suspicious application may be identified as not being malicious.

Alternately, based on identifying that the suspicious application is not malicious after isolating the suspicious application, the electronic apparatus may display the UI for asking whether to release the isolation for the suspicious application, and release the isolation for the suspicious application based on a user's consent being input.

In order to release the isolation, the mount point of the mount namespace set for the suspicious application may be changed from the dummy directory to the shared directory, and the ID of the IPC namespace of the suspicious application may be changed to the IPC namespace ID set for the application that has been found not to perform the malicious actions.

In addition, the present controlling method may display a UI indicating the isolation of the suspicious application based on the suspicious application being isolated, and may display the UI indicating the release of the isolation for the suspicious application based on the isolation for the suspicious application being released.

According to various embodiments described above, it is possible to protect the device efficiently and reliably from the suspicious application. In particular, based on an application being identified as being suspicious (i.e., potentially malicious), the application may be dynamically isolated within the device and the cost of the dynamic isolation may be minimized. Besides, according to the embodiments, the minimum operation of the suspicious application may be changed. In addition, if the suspicious application is identified as a false-positive, the suspicious application may be returned to an existing environment. Alternatively, the suspicious application may be finally identified as being a malicious (malignant) application based on continued analysis. According to the embodiments, the suspicious application may be processed with the minimum extra cost (performance, such as computer costs/performance and processing load), and may also be interoperable with an existing application auditing technology.

The various embodiments described above may be implemented by software, hardware, or a combination thereof. According to the hardware embodiment, embodiments that are described in the disclosure may be implemented by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In particular, the various embodiments described above may be implemented by the processor 110 of the electronic apparatus 100. In a software configuration, various embodiments described in the specification such as a procedure and a function may be embodied as separate software modules. The software modules may respectively perform one or more functions and operations described in the present specification.

The various embodiments of the disclosure may be embodied as a software including a command that is storable in a machine-readable storage media (e.g., a computer). The machine is a device capable of calling the stored command from the storage media and operating according to the called command, and may include the electronic apparatus 100 of the disclosed embodiments.

When such command is executed by the processor, the processor may directly or under the control of the processor perform a function corresponding to the command by using other components. The command may include code generated or executed by a compiler or interpreter. For example, the command stored in the storage media is executed by the processor so that the aforementioned controlling method may be executed. In particular, in response to the execution of the command stored in the storage media by the processor of the device (or the electronic apparatus), the controlling method of the electronic apparatus including monitoring malicious actions for a plurality of running applications, detecting a suspicious application among the plurality of applications based on the monitoring result, isolating the suspicious application by blocking communication with other applications stored in the electronic apparatus and access to a shared directory, and when the suspicious application is identified not to be malicious after isolating the suspicious application, releasing of the isolation for the suspicious application may be performed.

The machine-readable storage media may be provided in the form of a non-transitory storage media. The 'non-transitory' merely means that the storage media does not include a signal and is tangible, and does not distinguish that data is stored semi-permanently or temporarily in the storage media.

According to an embodiment, the method according to various embodiments disclosed herein may be provided by being included in a computer program product. The computer program product may be traded between a seller and a buyer as a product. The computer program product may be distributed online in the form of the machine-readable storage media (e.g., a compact disc read only memory (CD-ROM)) or through an application store (e.g., Play Store™ and App Store™). In case of the online distribution, at least a part of the computer program product may be stored at least temporarily or created temporarily in the storage media such as a memory of a manufacturer server, an application store server, or a relay server.

Each component (e.g., a module or a program) according to various embodiments may be composed of a singular or plural number of objects, and some of subcomponents among the aforementioned subcomponents may be omitted, or other subcomponents may be further included in various embodiments. Alternately or additionally, some components (e.g., a module and a program) may be integrated into one entity to perform the same or similar functions performed by each corresponding components prior to the integration. Operations performed by a module, a program module, or other component, according to various embodiments, may be sequential, parallel, or both, executed iteratively or heuristically, or at least some operations may be performed in a different order, omitted, or other operations may be added.

The foregoing embodiments and advantages are merely and are not to be construed as limiting the disclosure. The present teaching may be readily applied to other types of apparatuses. Also, the description of the embodiments of the disclosure is intended to be illustrative, and not to limit the scope of the claims, and many alternatives, modifications, and variations will be apparent to those skilled in the art.

What is claimed is:

1. A controlling method of an electronic apparatus comprising:
    monitoring whether an application executed by the electronic apparatus performs a potentially malicious action;
    detecting that the application is a suspicious application based on the monitoring of the potentially malicious action,
    isolating the suspicious application, wherein the isolating of the suspicious application includes at least one of: blocking communication with other applications executed by the electronic apparatus or blocking access to a shared memory of the electronic apparatus; and
    based on identifying the potentially malicious action of the suspicious application is not malicious after isolating the suspicious application, releasing the isolating of the suspicious application,
    wherein the application executed by the electronic apparatus has a different mount namespace set than another application executed by the electronic apparatus, and
    wherein the isolating comprises changing a mount point of the mount namespace set for the suspicious application from the shared memory to a dummy directory, and blocking the suspicious application from accessing the shared memory.

2. The method as claimed in claim 1, wherein the releasing the isolation comprises changing the mount point of the mount namespace set for the suspicious application from the dummy directory to the shared memory.

3. The method as claimed in claim 1, wherein the detecting comprises detecting actions of each of a plurality of running application, and based on a result of comparing the detected actions to a predetermined pattern of malicious actions, detecting the suspicious application among the plurality of running applications.

4. The method as claimed in claim 1, wherein the releasing of the isolating comprises, based on actions of the suspicious application being detected to correspond to a user's intention after isolating the suspicious application, identifying that the suspicious application is not malicious.

5. The method as claimed in claim 1, further comprising displaying a user interface (UI) indicating the isolating of the suspicious application based on the suspicious application being isolated.

6. The method as claimed in claim 1, further comprising displaying a user interface (UI) indicating the release of the isolating of the suspicious application based on the isolating of the suspicious application being released.

7. The method as claimed in claim 1, wherein the releasing of the isolating comprises, based on the suspicious application being identified not to be malicious after isolating the suspicious application, displaying a user interface (UI) asking whether to release the isolating of the suspicious application, and based on a user consent being input, releasing the isolating of the suspicious application.

8. A controlling method of an electronic apparatus comprising:
monitoring whether an application executed by the electronic apparatus performs a potentially malicious action;
detecting that the application is a suspicious application based on the monitoring of the potentially malicious action;
isolating the suspicious application, wherein the isolating of the suspicious application includes at least one of: blocking communication with other applications executed by the electronic apparatus or blocking access to a shared memory of the electronic apparatus; and
based on identifying the potentially malicious action of the suspicious application is not malicious after isolating the suspicious application, releasing the isolating of the suspicious application,
wherein the isolating comprises chancing an inter-process communication (IPC) namespace ID set for the suspicious application from the shared memory to a dummy directory and blocking communication between the suspicious application and other applications by setting an identifier (ID) of an IPC namespace predetermined for the suspicious application, and
the ID of the predetermined IPC namespace is different from an IPC namespace ID set for an application identified not to be performing any potentially malicious actions.

9. The method as claimed in claim 8, wherein the releasing the isolation comprises changing the ID of the IPC namespace of the suspicious application to the IPC namespace ID set for the application identified not to be performing any potentially malicious actions.

10. An electronic apparatus comprising:
a memory configured to store computer executable instructions; and
a processor configured to execute the computer executable instructions, which cause the processor to:
monitor whether an application executed by the electronic apparatus performs a potentially malicious action,
detect that the application is a suspicious application based on the monitoring of the potentially malicious action,
isolate the suspicious application, wherein the isolating of the suspicious application includes at least one of: blocking communication with other applications executed by the electronic apparatus or blocking access to a shared memory, and
based on identifying the potentially malicious action of the suspicious application is not malicious after isolating the suspicious application, release the isolating of the suspicious application,
wherein the application executed by the electronic apparatus has a different mount namespace set than another application executed by the electronic apparatus, and
wherein the processor is configured to change a mount point of a mount namespace set for the suspicious application from the shared memory to a dummy directory, and block the suspicious application from accessing to the shared memory.

11. The electronic apparatus as claimed in claim 10, wherein the processor is configured to change the mount point of the mount namespace set for the suspicious application from the dummy directory to the shared memory in order to release the isolating.

12. The electronic apparatus as claimed in claim 10, wherein the processor is configured to detect actions of each of a plurality of running applications, and based on a result of comparing the detected actions to a predetermined pattern of malicious actions, detect the suspicious application among the plurality of running applications.

13. The electronic apparatus as claimed in claim 10, wherein the processor is configured to, based on the actions of the suspicious application being detected to correspond to a user's intention after the isolating of the suspicious application, identify that the suspicious application is not malicious.

14. The electronic apparatus as claimed in claim 10, wherein the processor is configured to, based on the suspicious application being isolated, control a display to display a user interface (UI) indicating the isolating of the suspicious application.

15. The electronic apparatus as claimed in claim 10, wherein the processor is configured to, based on the isolating of the suspicious application being released, control a display to display a user interface (UI) indicating the release of the isolating of the suspicious application.

16. The electronic apparatus as claimed in claim 10, wherein the processor is configured to, based on the suspicious application being identified not to be malicious after the isolating of the suspicious application, control a display to display a user interface (UI) asking whether to release the isolating of the suspicious application and based on a user consent being input through the UI, release the isolating of the suspicious application.

17. An electronic apparatus comprising:
a memory configured to store computer executable instructions; and
a processor configured to execute the computer executable instructions, which cause the processor to:
monitor whether an application executed by the electronic apparatus performs a potentially malicious action,
detect that the application is a suspicious application based on the monitoring of the potentially malicious action,
isolate the suspicious application, wherein the isolating of the suspicious application includes at least one of: blocking communication with other applications executed by the electronic apparatus or blocking access to a shared memory, and
based on identifying the potentially malicious action of the suspicious application is not malicious after isolating the suspicious application, release the isolating of the suspicious application,
wherein the processor is configured to chance an inter-process communication (IPC) namespace ID set for the suspicious application from the shared memory to a dummy directory and set an identifier (ID) of an IPC namespace predetermined for the suspicious application to block communication between the suspicious application and other applications, and
the ID of the predetermined IPC namespace is different from an IPC namespace ID set for an application identified not to be performing any potentially malicious actions.

18. The electronic apparatus as claimed in claim 17, wherein the processor is configured to change the ID of the IPC namespace of the suspicious application to the IPC namespace ID set for the application identified not to be performing any potentially malicious actions in order to release the isolating.

* * * * *